3,285,764
REMOISTENABLE GUMMED SHEET MATERIAL AND COMPOSITION FOR MAKING THE SAME
George R. Nelson, Holliston, and Gregory Botsaris, Cambridge, Mass., assignors to Dennison Manufacturing Company, Framingham, Mass., a corporation of Nevada
Filed May 25, 1962, Ser. No. 197,696
18 Claims. (Cl. 106—129)

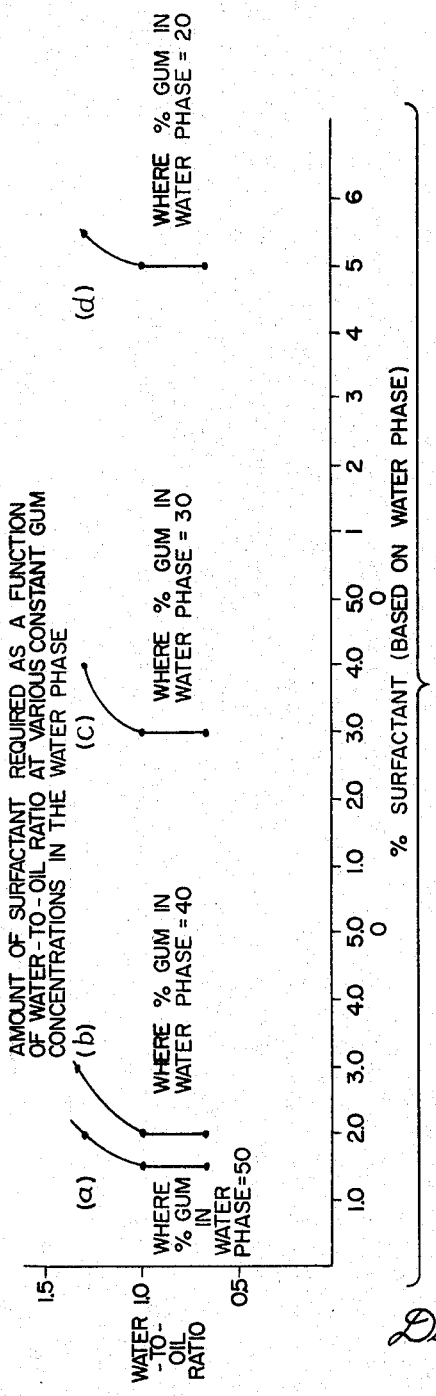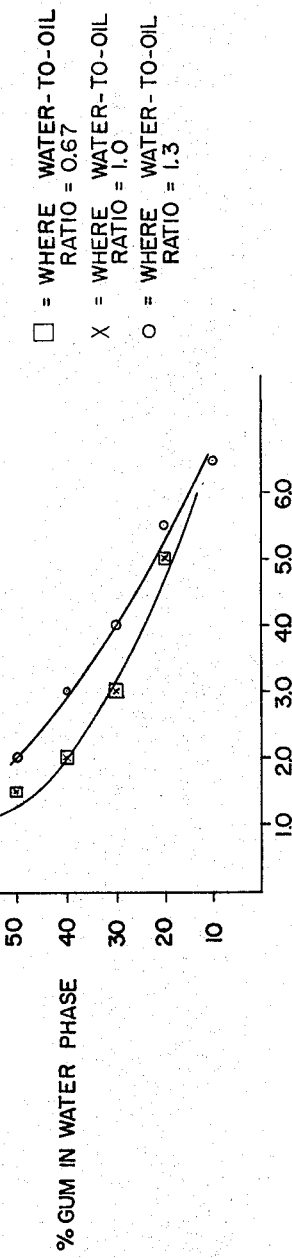

This invention relates to gummed sheet material, that is, sheet material, e.g. paper, fabric, etc. having adhered thereto a coating or film of dry adhesive, commonly referred to as a gum, e.g. animal glue, starch products, such as dextrin, gum arabic, etc., which can be moistened with water to develop an adhesive tackiness which permits the sheet to be attached to another surface. Gummed labels and postage stamps are common examples. Adhesives of this nature are commonly called remoistenable or water-activatable adhesives or gums and these terms are herein used to include any normally non-tacky adhesive which can be activated with water to develop adhesive tackiness.

A serious problem with such gummed sheet material has been that of curling in response to changes in humidity due to unequal contraction and expansion of the adhesive or gum film and the backing sheet to which it is adhered.

Attempts to solve this problem by physically breaking or cracking the dried continuous gum film laid down by an aqueous gum solution to render it discontinuous and by adding filler material embedded in the gum have not been successful.

Another method which has been advanced for solving this problem is to form a dispersion of discrete solid particles of dry, finely divided water-activatable gum, e.g. glue, dextrin, etc., in a solution of a water-soluble, solvent soluble, resinous, film forming binder material, e.g. polyvinyl methyl ether, polyacrylamide, vinyl methyl ether-maleic anhydride copolymer, polyvinyl pyrrolidone, hydroxy methyl cellulose ether, amine salts of polyvinyl acetate-maleic anhydride copolymer, etc., in a solvent in which the gum is not soluble. Consequently, upon evaporation of the solvent after the dispersion is applied to the backing sheet, the dispersed, dry, solid particles of gum are embedded as discrete particles in a matrix of resinous binder material (originally dissolved in the solvent), which separates the particles of gum and binds them to each other and to the paper. Thus, the gum in the dried film is rendered completely discontinuous by the binder material. The main disadvantage of this method is that a relatively large amount of binder material (at least one part per four parts of gum or about one-fifth of the final film) is required for adequate binding and the binder does not have nearly as good quick tack or adhesiveness as the water-activatable gum particles embedded therein. Consequently, quick tack and adhesiveness of the film are substantially reduced. Furthermore, the binder material is relatively costly and a large amount of solvent is required which increases the cost. Thus, although this method solved the problem of curl, it introduced new problems of decreased wettability, quick tack and adhesiveness and increased cost.

A technique which has been proposed to overcome the problem of curl while at the same time reducing these disadvantages inherent in the use of discrete particles embedded in a binder material, is to disperse or emulsify an aqueous solution of the water-activatable gum (rather than finely divided, discrete, dry particles) in the solvent containing in solution the binder material (either a water-soluble, solvent-soluble binder material or a water-insoluble, solvent-soluble binder material such as ethyl cellulose, polyviny ester copolymer, polyvinyl chloride, butadiene-styrene copolymers, polymers of acrylic acid, polyvinyl acetate-maleic anhydride copolymer, etc.). Strangely enough, it was found that when this emulsion is applied and dried the globules of aqueous gum solution, during drying, coalesce with each other and adhere to the backing sheet at spaced points or areas on the surfaces thereof to form in the dried film a lace-work skeleton of the water-activatable gum which is surrounded by a lace-work skeleton of the binder material and which is adhered to the backing sheet at spaced areas. The binder material continues to function as a binder to bind the dried globules of gum together and to the backing sheet. It also performs the additional function of acting as a partial barrier between the globules of gum solution to keep them partially separated and thereby prevent them from coalescing completely, which would result in a continuous film with resultant curling. Therefore, the binder material continues to render the gum in the dried film discontinuous but only partially discontinuous as compared to the use of a dispersion of dry gum particles. This partial discontinuity is sufficient to prevent curl. Thus, the binder material continues to function to prevent curl as well as to bind the gum particles together. However, since the spaced areas of coalescence between the globules and the spaced areas of adhesion of the globules to the backing sheet contribute substantially to binding the dried gum globules to each other and to the paper and since the binder material provides only partial discontinuity of the gum, a substantially smaller amount of binder material is required as compared with the dispersion of dry gum particles with the result that quick tack and adhesiveness on rewetting are substantially improved while at the same time the non-curling properties of the gummed sheet compare favorably with those obtained with the use of the dry particles. It is apparent that by reducing the amount of binder material, the amount of water-activatable gum per unit area of dried film is substantially increased to thereby increase quick tack and adhesiveness of the film. Also, the cost is substantially reduced. As a matter of fact, by this method, the amount of binder material required can be more than halved without materially sacrificing non-curling properties. Nevertheless, even with this method, substantial amounts of binder material are still required to achieve adequate discontinuity to prevent curl with consequent reduction in quick tack and adhesiveness and increased cost, as compared to the use of a continuous film of water-activatable gum.

Thus, the use of a substantial quantity of binder material (at least 1 part to 12 parts of gum or about 8% based on weight of gum) has been considered to be essential to produce a non-curling, water-activatable gum film from a dispersion of water-activatable gum in a solvent, whether the gum is dispersed in the form of discrete dry particles or in the form of an aqeous solution. Although, as aforesaid, such binder material reduces substantially the quick tack and adhesiveness of the dried film and substantially increases cost, these disadvantages have been accepted in order to achieve good non-curling properties.

The principal object of the present invention is to provide a novel water-activatable gummed sheet material and composition for making the same which utlizes a dispersion of water-activatable gum in a solvent and in which the necessity of a binder material is eliminated altogether to thereby achieve a degree of quick tack and adhesiveness closely approximating that of a continuous gum film while at the same time retaining adequate binding and a degree of non-curl comparable with the non-curl achieved in the above methods utilizing a binder material. Thus, the dried gum film of the present invention has the advantages of a continuous water-activatable gum film with respect to quick tack and adhesiveness without the disadvantage of curl. It has the advantages of the above-mentioned methods using a binder material with respect to non-curl without the disadvantages of decreased quick tack and adhesiveness and increased costs. The binder material can be eliminated altogether or the amount thereof can be reduced to a quantity which is substantially smaller than the minimum amount (about 8% based on weight of gum) heretofore required to achieve a satisfactory non-curling gummed sheet. Thus, the term "substantially free from resinous binder material" as used herein with reference to the dried gum film and emulsion of the present invention includes the absence of such binder material altogether as well as the presence of relatively small amounts of such binder material less than the above-mentioned minimum amount heretofore required to achieve a satisfactory non-curling gummed sheet material, i.e. less than about 8% based on weight of gum. In this respect, it is believed such minimum amount is the minimum amount required to form a binder matrix in the dried film. Below this minimum amount the binder material ceases to perform satisfactory binding and separating functions.

This is achieved in accordance with the present invention by the use of a water-in-oil emulsion of an aqueous solution of water-activatable gum in a water-immiscible solvent containing a non-volatile, solvent-soluble surface active agent, which has the property of forming a water-in-oil emulsion, as distinguished from an oil-in-water emulsion, when such gum solution and solvent are intermixed with each other in the presence of such agent, which is relatively water insoluble compared to its solvent solubility but which is soluble to some extent in water. More particularly, the surface active agent is a sulfonated carboxylic acid ester.

The surface active agent performs two functions, one, it provides a water-in-oil emulsion when the gum solution and solvent are mixed together and two, it renders the gum in the final dried film sufficiently discontinuous to prevent curl while at the same time permitting the globules of gum in the water-in-oil emulsion, during drying, to coalesce with each other and to adhere to the backing sheet sufficiently at spaced areas on the surfaces thereof to bind the dried globules together and to the backing sheet in the dried film.

Preferred sulfonated carboxylic acid esters are sulfonated alkyl esters of aliphatic polycarboxylic acids. Most preferable are those having the formula:

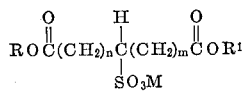

in which R and $R^1$ are alkyl groups containing from 6 to 18 carbon atoms, but preferably from 8 to 13 carbon atoms, $n$ ranges from 0 to 3, $n$ plus $m$ ranges from 0 to 7, but preferably from 0 to 3, and M is selected from the group consisting of a monovalent metal, such as an alkali metal and ammonium.

The surface active agent forms a thin, protective coating or film around the globules of gum solution in the emulsion (the gum solution comprises the discontinuous internal phase of the water-in-oil emulsion whereas the solvent comprises the continuous external phase). During drying of the emulsion after it is applied to the backing sheet, spaced surface areas of the coated globules of sticky gum solution come in contact with each other and the backing sheet. It is believed that such contact causes the film of surface active agent at the contact areas to diffuse into the globules of gum solution thereby exposing the underlying spaced surface areas of the sticky globules to each other and to the backing sheet. This results in coalescence between the globules at such exposed spaced surface areas and adhesion between such areas and the backing sheet where they come in contact with each other. In this way, the dried globules of gum in the final film are bound to each other and the backing sheet at these spaced areas where coalescence and adhesion occurred. However, substantial portions of the globule surfaces between the above-mentioned contact areas remain coated by the coating of surface active agent and consequently cannot coalesce with adjacent globules because the protective coating of surface active agent acts as a barrier. In effect, the above-mentioned diffusion and coalescence at the spaced contact areas renders the coating around the globules discontinuous. As a result, the gum in the final film is in the form of a lace-work structure adhered at spaced areas to the backing sheet and with the discontinuous coating of surface active agent therebetween still acting as a barrier separating the non-coalesced and non-adhered coated surfaces of the dried globules to thereby prevent them from coalescing. Sufficient partial discontinuity of the water-activatable gum in the dried gum film is achieved in this manner to prevent curl.

It is believed that diffusion of the film of surface active agent into the globules of gum solution at these small spaced contact areas is due to the absence of solvent at such areas upon contact. Consequently, there is no longer any water-oil interface at the contact areas. In the absence of solvent, for which the surface active agent has a greater affinity than water, the tiny amount of slightly water soluble surfactant film at each small contact area diffuses into the water phase. The limited water solubility of the surfactant limits the total amount of diffusion thereof into the water phase.

The above-mentioned spaced areas of coalescence and adhesion are relied on entirely for binding the dried glue film together and to the backing sheet and the discontinuous protective coating of surface active agent is relied on to prevent curl so that the necessity for a resinous binder material is eliminated. As a result, quick tack and adhesiveness are substantially improved. Although the surface active agent has poor quick tack and adhesive properties, only insignificant amounts are required to achieve non-curl as compared to the minimum amount of resinous binder material required. This is probably because it is present in the dried gum film in the form of a very thin, discontinuous coating or film and not a matrix. Furthermore, even when present in larger amounts, it does not reduce quick tack of the dried gum film nearly as much as a like amount of resinous binder material. Because only insignificant amounts of surface active agent are required, dry gum films can be obtained which contain a much greater amount of water-activatable gum per unit area than is possible with the use of a resinous binder material. The surface active agent does not function as a binder. However, because it acts as a protective barrier to prevent substantial surface areas of the globules from coalescing, it prevents curling just as effectively as the resinous binder material even in the relatively insignificant amounts which are required.

It is believed that the hydrophylic portion, e.g. the sulfonate radical of the above-mentioned sulfonated esters, becomes anchored in the aqueous internal phase and the hydrophobic portion, e.g. the alkyl radicals in the above-mentioned sulfonated esters, become anchored in the solvent to thereby form a protective coating over the globules of gum solution. This same surface activity of the surface active agent which causes it to collect at the interfaces of the globules of gum solution in the form of a protective coating surrounding the gum globules not only provides a partial barrier, as aforesaid, to prevent complete coalescence, but also functions to keep the gum solution in stable emulsion.

It has been found that the minimum amount of surface active agent required to form a stable water-in-oil emulsion is adequate to provide a sufficient coated area in the dried gum film to prevent curling and a sufficient area of coalescence to provide adequate binding of the gum particles to each other and to the backing sheet.

In a preferred embodiment, at least a part of the water-activatable gum, preferably at least 25% based on total dry weight of the gum in the solution, is a proteinaceous gum, preferably an animal glue.

With the sulfonated alkyl esters of aliphatic carboxylic acids described above, it has been found that the longer the alkyl chains R and $R^1$ the less the curl but the poorer the binding. The shorter such chains the worse the curl and the better the binding. Evidently, the longer the carbon chains and hence, the more hydrophobic the surface active agent, the greater the area of the gum globules protected against coalescence by such agent and hence, the less the total area of coalescence. Where complete coalescence occurs binding is, of course, excellent but curling is bad (this is the case of the continuous gum film), such curling decreasing and such binding decreasing as the degree of total coalescence is reduced and the degree of discontinuity of the dried gum film by the coating of surface active agent is at the same time increased. It is desirable to achieve the optimum amount of coalescence which will give good binding without curl. This is done by selection of the length of the alkyl chains.

This variation in binding and curling effect, depending on how hydrophobic the surface active agent is, indicates that the discontinuity of the coating surrounding the globules with resulting coalescence at the spaced surface areas of contact of the coated globules is caused by diffusion of the agent at such spaced contact areas into the globule solution, the less hydrophobic the material, the greater the amount of diffusion and hence, the greater the area of coalescence and the greater the binding. This increased amount of diffusion decreases the total area of the globules protected by the coating of surface active agent to thereby decrease non-curl effect. By reducing the length of the alkyl chains, the surface active agent is rendered more water soluble and hence, more readily diffusible into the aqueous phase at the areas of contact.

It is advantageous to use a surface active agent which is as hydrophylic as possible while still achieving good non-curl properties because the more hydrophylic the agent the better the quick tack and wettability although the amount of surface active agent required is so small that even a more hydrophobic material does not present a serious problem so long as there is sufficient coalescence for proper binding.

The same water-immiscible solvents used in the above-mentioned methods utilizing a resinous binder material can be used for the continuous external phase of the emulsion of the present invention. However, since in the present invention they do not contain any substantial amounts of binder material, it is more appropriate to refer to them as liquid carriers rather than solvents.

A preferred method of preparing the water-in-oil emulsion of the present invention is to dissolve the water-activatable gum in water, and with vigorous stirring add this aqueous solution to the water-immiscible oil or solvent phase containing the surface active or emulsifying agent or agents to form a water-in-oil emulsion.

A simple routine test to determine that the emulsion is a water-in-oil emulsion is that described by P. Becker and reported in "Emulsions, Theory and Practice," page 327, published by Reinhold Publishing Corp., 1957. This method comprises immersing two electrodes connected to a light source in the emulsion. If the light burns brightly, an oil-in-water emulsion has been formed. If the light does not light up or is very weak, a water-in-oil emulsion has been formed. If the light is very weak, this indicates that the emulsifying agent, or some other ions are soluble in the oil or solvent phase and are conductors. It is an essential feature of this invention that the emulsion is a water-in-oil emulsion.

If desired, in the preparation of the emulsion, the ingredients may be homogenized in a homogenizer or colloid mill, especially where highly viscous gum solutions are used. However, simple stirring is ordinarily sufficient.

With the use of animal glue, it is preferred to heat the glue solution, e.g. 120° F. or 140° F., prior to addition to the oil phase in order to facilitate mixing. However, the invention is in no way limited in this respect except that where the solution is heated, the temperatures should not be so high as to cause degradation of the glue.

*Example 1*

*Part I.*—100 parts of a 50% aqueous solution of a 50/50 mixture of corn dextrin (a water-activatable adhesive gum) and a bone glue (also a water-activatable adhesive gum) having a viscosity of 275 millipoises at 25% concentration is made up by first cooking the dextrin in conventional manner, then lowering the temperature to 120° F. and adding the glue. The pH of this gum solution is adjusted to 5.8 with hydrochloric acid.

*Part II.*—To 100 parts of toluene (a water immiscible solvent or carrier) is added and thoroughly mixed 2.4 parts of the dioctyl ester of sodium sulfo-succinic acid (surface active agent) based on total weight of Part I and having the formula:

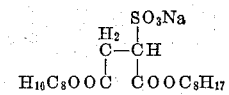

To part II is added part I (at 120° F.) with continuous stirring. The stirring is continued until all of the gum solution has been added. Stirring is then discontinued. A stable water-in-oil emulsion, i.e. an emulsion of the glue and dextrin aqueous solution in toluene, is formed in accordance with the above-mentioned test. Thus, the toluence forms the continuous external phase and the gum solution the discontinuous internal phase. When applied to paper in an amount equal to four pounds per ream 20 x 25—500, dried in a conventional manner at elevated temperatures and steamed flat, the gummed paper remained flat when cycled at extremes in relative humidity ranging from 20% R.H. to 60% R.H. The gum film had good cohesion and adhesion to the paper backing. The quick tack and adhesiveness of the gummed paper was markedly betted than a gummed sheet having a gum film made from an emulsion of the same gum solution in toluene containing dissolved therein a minimum amount of resinous binder material to achieve satisfactory non-curl properties. The improvement in quick tack and adhesiveness was even more marked over a gum film made from a dispersion of dry, solid, discrete gum particles (the same gums) in toluence containing enough dissolved binder to adequately bind the discrete particles together.

Other conventional water-activatable gums which are water soluble but solvent insoluble can be used in the above example in place of the dextrin such as polysaccharide, casein, carboxy methyl cellulose, gum arabic, polyvinyl alcohol, etc.

As has already been stated, best results have been achieved where at least part of the gum, preferably at least 25% and better still 30% of the total dry weight of gum, is a proteinaceous gum, preferably an animal glue, such as a hide or bone glue. In practice, gum solutions containing 33% and more animal glue based on the total dry weight of the dissolved gum have proved quite satisfactory. When animal glue is not used or the amount of animal glue is less than 25% by dry weight of the total gum in solution, it is more difficult to achieve stable water-in-oil emulsions. Mixtures of animal glue and dextrin are preferred but excellent results have been achieved with the use of animal glue only.

Any solvent soluble sulfonated carboxylic acid ester, which is relatively water insoluble compared to its solvent solubility, i.e. substantially greater affinity for the solvent than for water, but which is soluble in water to some extent, can be used in place of the dioctyl ester of sodium sulfosuccinic acid in the above example. As aforesaid, an alkyl ester of an aliphatic polycarboxylic acid is preferred. A preferred alkyl ester of an aliphatic polycarboxylic acid is one having the above described formula. Examples of the di-carboxylic acid of such formula, in addition to succinic acid, are glutaric acid, malonic acid, azelaic acid, sebacic acid, adipic acid, etc. Sulfonated succinic acid esters, such as the dioctyl, didecyl and di(tridecyl) esters, have proved very satisfactory and are preferred, the dioctyl ester being the most preferable. A sulfonated aliphatic polyester sold by Antara Chemical Co. under the trademark Nekal NS has also proved highly satisfactory as a surface active agent.

Any inert organic, relatively water-immiscible liquid in which the water-activatable gum is not soluble but in which the surface active agent is soluble may be used in place of the toluene in the above example (external oil phase). Examples are liquid alcohols, hydrocarbons, ketones, esters, etc., such as xylene, trichloroethylene, methyl isoamyl ketone, carbon tetrachloride, heptane, benzol, 2-ethyl butyl alcohol, etc. and mixtures thereof. When it is stated that the liquid is relatively water-immiscible, it is meant that the liquid is at least incompletely miscible with water. It may be either completely water-immiscible or partially miscible with water so long as it is sufficiently immiscible to form a dispersion of the aqueous gum solution therein.

In the accompanying drawings,

FIG. 1 is a chart showing minimum percentages of the surfactant of Example 1 versus the water-to-oil ratio for various concentrations of gum in the water phase;

FIG. 2 is a chart showing the minimum percentage of the surfactant versus the percent gum in the water phase at various water-to-oil ratios.

Figure 3:
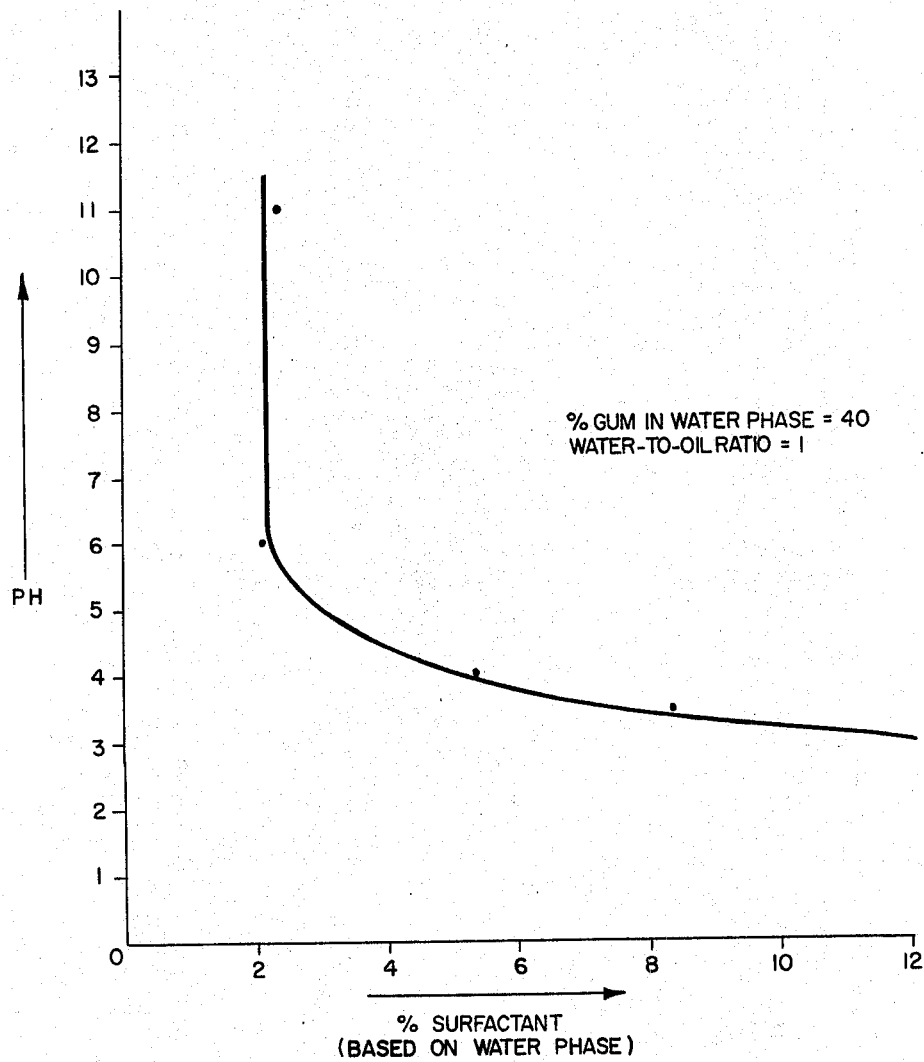
FIG. 3 is a chart showing the minimum percentage of surfactant versus pH for a given water-to-oil ratio and gum concentration in the water phase.

As aforesaid, the minimum amount of surface active agent required to give a water-in-oil emulsion is adequate to coat a sufficient surface area of the dried globules of gum solution to prevent excessive coalescence and hence curling while at the same time providing adequate coalescence and adhesion between the dried glue globules and the backing sheet to bind the dried globules together and to the backing sheet. There is a minimum amount of surface active agent below which either the emulsion will be in the form of an oil-in-water emulsion or no stable emulsion will be formed. This minimum amount depends on a number of variables, namely, (1) the concentration of gum in solution in the aqueous phase, (2) the ratio of aqueous phase (gum solution) to oil phase (carrier or solvent), (3) the pH of the system and (4) the ratio of animal glue to other water-activatable gums in the aqueous phase when such mixtures are used. The relationships of the minimum amount of surfactant to these variables are shown in the graphs of FIG. 1, which shows the relationship of the minimum quantity of surface active agent to the ratio of aqueous phase to oil phase at different constant concentrations of the gum, FIG. 2, which shows the relationship of minimum concentration of surface active agent to the concentration of water-activatable gum in water at constant water phase to oil phase ratios and FIG. 3 which shows the relationship of minimum quantity of surface active agent to the pH of the emulsion. However, in all cases, the minimum amount of surface active agent is the minimum amount required to achieve a water-in-oil emulsion and this can be determined by the simple routine laboratory test referred to above involving only a simple observation. For example, for any particular composition, if a small amount of surface active agent is not enough to provide a water-in-oil emulsion in accordance with this simple routine test, then it is only necessary to add enough to provide such an emulsion.

It will be noted from FIG. 1 that with a constant gum concentration, the higher the ratio of aqueous phase to oil phase (hereinafter referred to as water-to-oil ratio), the greater the minimum concentration of surface active agent required to achieve a water-in-oil emulsion. However, the minimum amount of surfactant required remains the same at water-to-oil ratios of 1 and below.

The maximum water-to-oil ratio at which a water-in-oil emulsion can be obtained is about 2.7. However, it is desirable to keep such ratio at one or less to avoid the necessity of adding a greater amount of surface active agent keeping in mind the fact that it is advantageous to keep the amount of such agent as small as possible since it is not a good adhesive. Also, for reasons set forth below, it is desirable to keep the water content of the emulsion as low as possible consistent with achieving adequate coalescence and adhesion being provided by the water. There is no real minimum water-to-oil ratio except a practical one directed by the fact that there should be sufficient gum solution in the composition to lay down a good gum film. The water-to-oil ratio may vary from the above-mentioned maximum down to about 0.3 but a preferred range is from about 0.67 to 1.3.

It will be noted from FIG. 2 that the greater the concentration of water activatable gum in the aqueous phase the less the minimum concentration of surface active agent required to achieve a water-in-oil emulsion. It is pointed out that at gum concentrations of 60 and above the viscosity of the gum solution increases to a point where more efficient mixing techniques may be required, e.g. a homogenizer, to obtain the desired emulsion. It is desirable that the gum solution contain the highest possible solids concentration commensurate with ease of preparation so that a minimum amount of water will be required. Put in another way, it is desirable to have the ratio of gum to water as high as possible consistent with having a sufficient amount of water in the system to provide adequate binding and adhesion. For this reason it is desirable to use low viscosity glues and proteins. One reason for a higher gum-to-water ratio is that less surface active agent is required. Another reason is that the greater the amount of water, the wetter the backing sheet becomes on application of the emulsion. It is desirable to wet the backing sheet as little as possible during such application to avoid initial curl in the sheet during manufacture as distinguished from curl due to changes in humidity after the gum film has been applied.

It will be noted from FIG. 3 that the minimum amount of surfactant increases with decrease in pH although at pH's of 6 and above, it stays substantially constant. It will be clear from the graph that low pH's are not particularly desirable because they require excessive amounts of surfactant.

Finally, where the gum solution contains a mixture of animal glue and another water activatable gum, the minimum amount of surfactant to achieve a stable water-in-oil emulsion increases with decreases in the ratio of animal glue to the other gum.

The use of a greater amount of surfactant than is required to insure a stable water-in-oil emulsion serves no beneficial purpose and increases the cost. Furthermore, it is harmful because it is not a good adhesive and consequently, increasing the amount thereof reduces quick tack and adhesiveness of the final film. Thus, it is desirable to keep the amount as small as possible.

Amounts of emulsifier varying from 1.5% to 20% based on weight of aqueous phase (gum solution) can be used but from 2.4% to 6% is preferred. Higher than 20% is uneconomical and begins to seriously affect the adhesiveness of the film.

However, it is clear from the above that the minimum amount of surfactant depends on so many variables that it is not practical to specify any one minimum. As aforesaid, the best, simplest and only practical way of expressing such minimum is to state that a sufficient amount of surfactant should be used to provide a water-in-oil emulsion, which amount can be determined for any particular composition by a simple routine test.

*Example 2*

Same as Example 1 except 20 parts of the dioctyl ester of sodium sulfosuccinic acid based on total weight of part I is added to the toluene of Part II. A water-in-oil emulsion was achieved. The quick tack and adhesiveness of the dried film are not quite as good as in Example 1 due to the increased amount of surfactant but they were better than the aforementioned methods using a resinous binder material. The non-curling properties were as good as Example 1.

*Example 3*

Same as Example 1 except that 2 parts of the di(tridecyl)ester of sodium sulfo succinic acid is added to the toluene of Part II. A water-in-oil emulsion was obtained and the dried film compared favorably with that part of Example 1 except that the quick tack was a little less due to the longer alkyl chains.

*Example 4*

Same as Example 1 except 8 parts of the dihexyl ester of sodium sulfosuccinic acid is added to the toluene. A water-in-oil emulsion was obtained and the dried film compared favorably with Example 1.

*Example 5*

Same as Example 1 except that the pH of the water phase is adjusted to 3.5. At this pH, it is necessary to add 12 parts of the dioctyl ester of sodium sulfo succinic acid to the toluene phase to obtain a water-in-oil emulsion. The dried film compared favorably with Example 1.

*Example 6*

Part I.—100 parts of a 50% solution of a bone glue having a viscosity of 380 millipoises when measured at 140° F. and 25% concentration using the Brookfield Viscosimeter, is made up and heated to 120° F.

Part II.—100 parts toluene containing 6 parts of the dioctyl ester of sodium sulfo succinic acid based on total weight of part I.

Part I was added to Part II with vigorous stirring. A water-in-oil emulsion was obtained. The dried film compared favorably with Example 1.

*Example 7*

Same as Example 1 except that the pH of the water phase was adjusted to 8, a hide glue having a viscosity of 400 millipoises when measured at 140° F. and 25% concentration using the Brookfield Viscosimeter was used and the amount of surfactant was 12 parts based on the weight of the aqueous phase. A water-in-oil emulsion was obtained. The dried film compared favorably with Example 1.

*Example 8*

Same as Example 1 except that a sulfonated aliphatic polyester sold under the trademark Nekal NS by Antara Chemicals was used in place of the dioctyl ester of sodium sulfo succinic acid. A water-in-oil emulsion was obtained and the film compared favorably with that of Example 1.

*Example 9*

Same as Example 1 except to 100 parts of the toluene is added 4.5 parts of dioctyl ester of sodium sulfosuccinic acid and 2.5 parts of an alkyl aryl polyether alcohol (another surfactant) sold under the trade name Triton X100 by Rohm & Haas and characterized as being nonionic.

A water-in-oil emulsion was obtained and the dried film compared favorably with that of Example 1.

*Example 10*

Same as Example 1 except to 100 parts of the toluene is added 5.0 parts of dioctyl ester of sodium sulfosuccinic acid and 0.7 part of a cationic emulsifier octadecyl trimethyl ammonium chloride. A water-in-oil emulsion was obtained. The dried film compared favorably with Example 1.

*Example 11*

This is an example of the presence of a small amount (2% based on weight of gum) of a solvent-soluble, water-insoluble resinous binder material (ethyl cellulose) dissolved in the toluene. This amount is far too small to itself provide a satisfactory non-curling gummed sheet. This example is the same as Example 1 except to 100 parts of the toluene is added and dissolved 1 part of an ethyl cellulose of 46.2% ethoxyl and 3.6 parts of dioctyl ester of sodium sulfosuccinic acid such that the ethyl cellulose is 2% based on the dry weight of the water-activatable gum. A water-in-oil emulsion was obtained. The dried film compared favorably with Example 1.

*Example 12*

Same as Example 1 except that the dioctyl ester of sodium sulfo sebacic acid is used in place of the dioctyl ester of sodium sulfosuccinic acid.

*Example 13*

Same as Example 1 except that the didecyl ester of sodium sulfo adipic acid is used in place of the dioctyl ester of sodium sulfosuccinic acid.

It is to be understood that this disclosure is for the purpose of illustration only and that the invention includes all equivalents and modifications which fall within the scope of the appended claims.

We claim:

1. A coating composition for preparing water remoistenable gummed sheet material comprising a dispersion of a water solution of a water-activatable gum as the discontinuous phase dispersed in a liquid carrier as the continuous phase which is sufficiently immiscible with water to keep the water solution in dispersion, said dispersion containing a non-volatile surface active agent soluble in said liquid carrier and having a hydrophilic portion and a hydrophobic portion, said agent having a limited water solubility less than its solubility in said carrier, said agent being present in an amount effective to maintain a water-in-oil emulsion between said liquid phases and to limit coalescence of particles of said gum when dried, said carrier being substantially free from dissolved resinous binder material.

2. A coating composition for preparing water remoistenable gummed sheet material according to claim 1 wherein said surface active agent is present in an amount between about 1.5 and about 20% of the weight of said water solution of gum, and wherein the weight ratio of said discontinuous phase to said continuous phase is between about 0.3 to 1 and about 2.7 to 1.

3. A coating composition according to claim 2, said surface active agent comprising a sulfonated carboxylic acid ester.

4. A coating composition according to claim 3, at least about 25% by weight of said gum comprising an animal glue.

5. A coating composition according to claim 1 wherein said agent is a sulfonated alkyl ester of an aliphatic carboxylic acid.

6. A coating composition according to claim 1 wherein said surface agent has the formula:

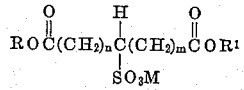

in which R and R¹ are alkyl groups each containing from 6 to 18 carbon atoms, $n$ ranges from 0 to 3, $n$ plus $m$ ranges from 0 to 7 and M is selected from the group consisting of a monovalent metal and ammonium.

7. A coating composition according to claim 6, where $n$ plus $m$ ranges from 0 to 3 and the alkyl groups R and R¹ contain from 8 to 13 carbon atoms.

8. A coating composition according to claim 9, at least about 25% by weight of said gum comprising an animal glue.

9. A coating composition according to claim 6 wherein said surface active agent is present in an amount between about 1.5 and about 20% by weight of said water solution of gum, and wherein the weight ratio of said discontinuous phase to said continuous phase is between about 0.3 to 1 and about 2.7 to 1.

10. A substantially non-curling gummer sheet material comprising a backing sheet having adherent thereto a dry non-tacky coating activatable to an adhesive condition by moistening with water, consisting of a water remoistenable gum film formed in situ on the backing sheet from a coating composition according to claim 1.

11. A substantially non-curling gummed sheet material comprising a backing sheet having adherent thereto a dry non-tacky coating activatable to an adhesive condition by moistening with water, consisting of a water remoistenable gum film formed in situ on the backing sheet from a coating composition according to claim 3.

12. A substantially non-curling gummed sheet material comprising a backing sheet having adherent thereto a dry non-tacky coating activatable to an adhesive condition by moistening with water, consisting of a water remoistenable gum film formed in situ on the backing sheet from a coating composition according to claim 6.

13. A substantially non-curling gummed sheet material comprising a backing sheet having adherent thereto a dry non-tacky coating activatable to an adhesive condition by moistening with water, consisting of a water remoistenable gum film formed in situ on the backing sheet from a coating composition according to claim 9.

14. The method of making a substantially noncurling remoistenable gummed sheet material which comprises preparing a water solution of a water-activatable gum, preparing a liquid carrier solution of a liquid substantially immiscible with said gum solution in which is dissolved a non-volatile surface active agent having a hydrophilic portion and a hydrophobic portion, said agent having a limited water solubility less than its solubility in said carrier liquid; mixing said solutions to form a water-in-oil emulsion, said agent being present in an amount effective to maintain said water-in-oil emulsion and to limit coalescence of particles of said gum when dried, coating said emulsion onto a backing sheet, and drying the emulsion.

15. The method according to claim 14, wherein said agent is present in an amount between about 1.5 to about 20% of the weight of said water solution, and the weight ratio of said water solution to said carrier solution is between about 0.3 to 1 and about 2.7 to 1.

16. The method according to claim 15, wherein said surface active active agent has the formula specified in claim 6.

17. The method according to claim 16, wherein $n$ plus $m$ ranges from 0 to 3 and the alkyl groups R, $R^1$ contain from 8 to 13 carbon atoms.

18. The method according to claim 16, wherein at least about 25% by weight of said gum comprises an animal glue.

References Cited by the Examiner

UNITED STATES PATENTS

| | | | |
|---|---|---|---|
| 2,021,716 | 11/1935 | Douthett | 117—28 |
| 2,162,194 | 6/1939 | Davis | 106—133 |
| 2,182,399 | 12/1939 | Hilbourn | 106—133 |
| 2,365,020 | 12/1944 | Stillwell | 117—122.5 |
| 2,577,821 | 12/1951 | Smith et al. | 106—135 |
| 2,870,039 | 1/1959 | McReynolds | 117—28 |
| 2,917,396 | 12/1959 | Agulnick | 106—128 |
| 2,978,343 | 4/1961 | Russo et al. | 106—128 |
| 3,104,179 | 9/1963 | Prior | 117—122 |

ALEXANDER H. BRODMERKEL, *Primary Examiner.*

MORRIS LIEBMAN, *Examiner.*

D. J. ARNOLD, *Assistant Examiner.*